United States Patent
Misumi et al.

(10) Patent No.: US 10,344,132 B2
(45) Date of Patent: Jul. 9, 2019

(54) EPOXY RESIN COMPOSITION, PREPREG AND FIBER REINFORCED COMPOSITE MATERIAL

(71) Applicant: Toray Industries, Inc., Tokyo (JP)

(72) Inventors: Jun Misumi, Ehime (JP); Hiroaki Sakata, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/072,361

(22) PCT Filed: Jan. 6, 2017

(86) PCT No.: PCT/JP2017/000270
§ 371 (c)(1),
(2) Date: Jul. 24, 2018

(87) PCT Pub. No.: WO2017/130659
PCT Pub. Date: Aug. 3, 2017

(65) Prior Publication Data
US 2019/0031847 A1 Jan. 31, 2019

(30) Foreign Application Priority Data
Jan. 26, 2016 (JP) ................................. 2016-012165

(51) Int. Cl.
| | | |
|---|---|---|
| *C08J 5/24* | (2006.01) | |
| *B29C 70/06* | (2006.01) | |
| *C08G 59/50* | (2006.01) | |
| *C08G 59/32* | (2006.01) | |
| *C08J 5/04* | (2006.01) | |

(52) U.S. Cl.
CPC ............... *C08J 5/24* (2013.01); *B29C 70/06* (2013.01); *C08G 59/3227* (2013.01); *C08G 59/50* (2013.01); *C08G 59/5033* (2013.01); *C08J 5/042* (2013.01); *C08J 5/043* (2013.01); *C08J 2363/00* (2013.01)

(58) Field of Classification Search
CPC ..... C08J 5/24; C08J 5/042; C08J 5/043; C08J 2363/00; B29C 70/06; C08G 59/50; C08G 59/3227; C08G 59/5033
USPC ....................................................... 523/400
See application file for complete search history.

(56) References Cited

U.S. PATENT DOCUMENTS

| | | |
|---|---|---|
| 4,746,718 A | 5/1988 | Gardner et al. |
| 5,049,627 A | 9/1991 | Edelman |
| 5,981,041 A * | 11/1999 | Ikegaya ............... H05K 3/4626 174/259 |
| 6,838,176 B2 | 1/2005 | Goto et al. |
| 2012/0010329 A1 | 1/2012 | Hunter et al. |
| 2013/0281559 A1* | 10/2013 | Park .......................... C09J 7/00 521/135 |
| 2014/0171551 A1 | 6/2014 | Patel et al. |

FOREIGN PATENT DOCUMENTS

| | | |
|---|---|---|
| JP | 6181423 A | 4/1986 |
| JP | 6189223 A | 5/1986 |
| JP | 61152724 A | 7/1986 |
| JP | 63250351 A | 10/1988 |
| JP | 01104624 A | 4/1989 |
| JP | 01319526 A | 12/1989 |
| JP | 0873566 A | 3/1996 |
| JP | 2001261783 A | 9/2001 |
| JP | 2002003581 A | 1/2002 |
| JP | 2012140574 A | 7/2012 |
| JP | 2012518707 A | 8/2012 |
| JP | 2015232145 A | 12/2015 |
| JP | 2016003335 A | 1/2016 |
| WO | 0181445 A1 | 11/2001 |

OTHER PUBLICATIONS

Ciba Specialty Chemicals, "TACTIX® 742 and TACTIX 123 (Resins) and Hardener HT 976", Mar. 1998 (Year: 1998).*
Jubail Chemical Industries, "Araldite® GY 6010", Jul. 2015 (Year: 2015).*
Common Chemistry, http://commonchemistry.org/ChemicalDetail.aspx?ref=31305-94-9,accessed Dec. 12, 2018 (Year: 2018).*
International Search Report and Written Opinion for International Application No. PCT/JP2017/000270, dated Apr. 4, 2017—5 pages.

* cited by examiner

*Primary Examiner* — David T Karst
(74) *Attorney, Agent, or Firm* — RatnerPrestia

(57) ABSTRACT

Provided are an epoxy resin composition for manufacturing a fiber reinforced composite material having excellent curability allowing for curing in a short time, and excellent storage stability and heat resistance, and a prepreg and a fiber reinforced composite material using the same. The epoxy resin composition includes at least an epoxy resin [A], a curing agent [B] having an exothermic onset temperature higher than the exothermic onset temperature of a component [C], as measured by a differential scanning calorimeter, and the component [C] contains a compound represented by a particular formula (a), and a prepreg and a fiber reinforced composite material using the same.

12 Claims, No Drawings

EPOXY RESIN COMPOSITION, PREPREG AND FIBER REINFORCED COMPOSITE MATERIAL

CROSS REFERENCE TO RELATED APPLICATIONS

This is the U.S. National Phase application of PCT/JP2017/000270, filed Jan. 6, 2017, which claims priority to Japanese Patent Application No. 2016-012165, filed Jan. 26, 2016, the disclosures of these applications being incorporated herein by reference in their entireties for all purposes.

TECHNICAL FIELD OF THE INVENTION

The present invention relates to an epoxy resin composition for producing a fiber reinforced composite material having high heat resistance, high latency, and high curability to achieve curing in a short time, and a prepreg including a reinforcing fiber impregnated with the epoxy resin composition, and a fiber reinforced composite material including an epoxy resin composition and a reinforcement fiber.

BACKGROUND OF THE INVENTION

High in heat resistance and corrosion resistance as well as mechanical properties such as strength and rigidity, in spite of being light in weight, fiber reinforced composite materials, which consist mainly of a reinforcement fiber, such as carbon fiber and glass fiber, and a thermosetting resin, such as epoxy resin and phenolic resin, have been used conventionally in a wide variety of fields including aerospace, automobiles, railway vehicles, ships, civil engineering, construction, and sports goods. In applications requiring high performance, in particular, fiber reinforced composite materials incorporating continuous reinforcement fibers are used, and carbon fibers, which are generally high in specific strength and specific elastic modulus, are adopted as reinforcement fiber. As the matrix resin, on the other hand, thermosetting resins are generally used and in particular, epoxy resins are adopted frequently because of good adhesive with carbon fibers, high heat resistance, high elasticity modulus, and high chemical resistance, as well as very small cure shrinkage. In recent years, fiber reinforced composite materials have to meet more rigorous requirements as their applications increase. When applied to structural members such as for aerospace applications and vehicles, in particular, they are required to maintain necessary physical properties under high-temperature and/or high-humidity conditions. However, although advantageous from the viewpoint of being lightweight, common polymer based composite materials are not sufficiently high in heat resistance and limited to a small range of applications.

As curing agents for epoxy resins, aromatic amine compounds, acid anhydrides, and phenol novolac compounds have been used frequently in aerospace industries where high heat resistance is emphasized. These curing agents, however, tend to require a long heating period at a high curing temperature of about 180° C. in the molding step. When using an epoxy resin composition with a low reactivity, therefore, some problems will occur including a long molding time and high energy cost required for the molding step. Thus, good techniques have been called for to enable quick, low-temperature curing of epoxy resin compositions.

In this connection, Patent documents 1 and 2 propose the use of cationic-polymerization type curing accelerators such as boron trifluoride-amine complexes and sulfonium salts to shorten the curing period for epoxy resins.

Patent document 3 describes that the use of a microencapsulated imidazole compound as a curing accelerator serves to shorten the curing time while exhibiting high storage stability at 25° C.

In Patent document 4, the use of a microencapsulated phosphorous curing accelerator serves to produce a highly heat resistant cured product while maintaining high storage stability at 50° C.

Patent document 5 describes that the use of a microencapsulated cationic polymerization initiator mixed with an epoxy resin serves to shorten the curing time while maintaining high storage stability.

PATENT DOCUMENTS

Patent document 1: Japanese Unexamined Patent Publication (Kokai) No. 2001-261783
Patent document 2: Japanese Unexamined Patent Publication (Kokai) No. 2002-003581
Patent document 3: International Publication WO 01/081445
Patent document 4: Japanese Unexamined Patent Publication (Kokai) No. HEI-8-73566
Patent document 5: Japanese Unexamined Patent Publication (Kokai) No. 2012-140574

SUMMARY OF THE INVENTION

When the curing accelerators described in Patent documents 1 and 2 are used, the storage stability (inhibition of increase in viscosity) will be low and the curing reaction of the epoxy resin will proceed in a resin kneading step or steps for producing intermediate base members such as prepreg, leading to a decreased workability and resulting in cured products with poor physical properties. Thus, they both cannot work practically.

In the case of the technique proposed in Patent document 3, a reaction occurs between an imidazole and an epoxy, resulting in a cured product with low heat resistance. In addition, sufficiently high storage stability cannot be maintained at high temperatures above 80° C.

In Patent document 4 as well, the curing time of resin compositions cannot be shortened sufficiently, suggesting a disadvantage relating to curing speed.

Also in Patent document 5, a curing reaction involving a cationic polymerization of an epoxy resin is used and this results in a cured product with low heat resistance.

Thus, an object of the present invention is to provide an epoxy resin composition having high heat resistance, high latency, and high curability to achieve curing in a short time and to provide a prepreg and fiber reinforced composite material produced therefrom.

The present invention adopts either of the following constitutions (i) and (ii) to solve the above problems. Specifically, (i) an epoxy resin composition including at least the following components [A] to [C], the content of each component meeting equations (1) and (2):

[A] an epoxy resin,

[B] a curing agent having a heat generation starting temperature as measured by differential scanning calorimetry higher than the heat generation starting temperature of component [C], and

[C] a compound as represented by formula (a),

[Chemical formula 1]

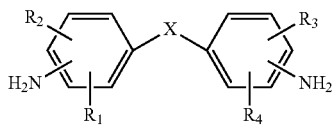

wherein in formula (a), X represents one selected from the group consisting of C=O, S=O, and O=P—OH, and $R_1$ to $R_4$ each represent at least one selected from the group consisting of a hydrogen atom, an aliphatic hydrocarbon group containing 1 to 4 carbon atoms, an alicyclic hydrocarbon group containing 4 or less carbon atoms, and a halogen atom, (1) 0.5≤(number of moles of active hydrogen atoms contained in component [B]+number of moles of active hydrogen atoms contained in component [C])/number of moles of epoxy groups in component [A]≤1.5, and (2) 0.02≤number of moles of component [C]/number of moles of component [B]≤5.0; and (ii) an epoxy resin composition including at least the following components [A] to [C], the content of component [C] being 1 to 25 parts by mass relative to 100 parts by mass of component [A], and the content of component [C] being 1 to 55 parts by mass relative to 100 parts by mass of component [B]:

[A] an epoxy resin,

[B]: a curing agent having a heat generation starting temperature as measured by differential scanning calorimetry higher than the heat generation starting temperature of component [C], and

[C] a compound as represented by formula (a),

[Chemical formula 2]

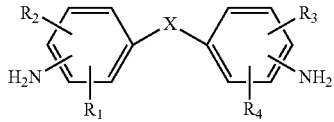

wherein in formula (a), X represents one selected from the group consisting of C=O, S=O, and O=P—OH, and $R_1$ to $R_4$ each represent at least one selected from the group consisting of a hydrogen atom, an aliphatic hydrocarbon group containing 1 to 4 carbon atoms, an alicyclic hydrocarbon group containing 4 or less carbon atoms, and a halogen atom.

The prepreg according to the present invention includes reinforcement fibers impregnated with an epoxy resin composition as specified in either item (i) or (ii) given above. The fiber reinforced composite material according to the present invention, on the other hand, is produced by curing the prepreg or it contains a cured resin produced by curing an epoxy resin composition as specified in item (i) or (ii), and reinforcement fibers.

The present invention provides an epoxy resin composition containing a curing agent and also containing a compound as represented by formula (a) as a curing accelerator so that the compound represented by formula (a) reacts with epoxy groups and causes heat generation to promote the reaction between the curing agent and epoxy groups, thus ensuring both a high curability to enable molding in a short time and a desired pot life at process temperatures commonly used for prepreg production. The use of an aromatic amine having a structure other than formula (a) as a curing accelerator may work to develop high curability to ensure quick molding, but will fail to achieve a sufficiently long pot life. A compound as represented by formula (a) has a rigid chemical structure and accordingly, the cured epoxy resin according to the present invention can have high heat resistance. The fiber reinforced composite material produced by curing the epoxy resin composition or prepreg according to the present invention can be molded in a shorter time as compared with conventional fiber reinforced composite materials that do not contain curing accelerators and can largely reduce the molding time and molding cost for production of applicable products including aircraft structure members, windmill blades, automobiles' exterior plates, computer parts such as IC trays and notebook computer housing.

DETAILED DESCRIPTION OF CERTAIN EMBODIMENTS OF THE INVENTION

The epoxy resin composition according to the present invention adopts either of the following constitutions (i) and (ii):

(i) an epoxy resin composition including at least the following components [A] to [C], the content of each component meeting equations (1) and (2):

[A] an epoxy resin,

[B]: a curing agent having a heat generation starting temperature as measured by differential scanning calorimetry higher than the heat generation starting temperature of component [C], and

[C] a compound as represented by formula (a), (1) 0.5≤(number of moles of active hydrogen atoms contained in component [B]+number of moles of active hydrogen atoms contained in component [C])/number of moles of epoxy groups in component [A]≤1.5, and (2) 0.02≤number of moles of component [C]/number of moles of component [B]≤5.0; and (ii) an epoxy resin composition including at least the following components [A] to [C], the content of component [C] being 1 to 25 parts by mass relative to 100 parts by mass of component [A], and the content of component [C] being 1 to 55 parts by mass relative to 100 parts by mass of component [B]:

[A] an epoxy resin,

[B]: a curing agent having a heat generation starting temperature as measured by differential scanning calorimetry higher than the heat generation starting temperature of component [C], and [C] a compound as represented by formula (a).

Component [A] used for the present invention is an epoxy resin having two or more glycidyl groups in a molecule. The use of an epoxy resin having less than two glycidyl groups in a molecule is not preferable because a cured product produced by heating and curing its mixture with a curing agent as described later will be low in glass transition temperature. Examples of the epoxy resins used for the present invention include bisphenol type epoxy resins such as bisphenol A type epoxy resin, bisphenol F type epoxy resin, bisphenol AD type epoxy resin, and bisphenol S type epoxy resin; brominated epoxy resins such as tetrabromo-bisphenol A diglycidyl ether; novolac type epoxy resins such as epoxy resins having a biphenyl backbone, epoxy resins having a naphthalene backbone, epoxy resins having a dicyclopentadiene backbone, phenol novolac type epoxy resins, and cresol novolac type epoxy resins; glycidyl amine type epoxy resins such as N,N,O-triglycidyl-m-aminophenol, N,N,O-triglycidyl-p-aminophenol, N,N,O-triglycidyl-4-amino-3-methyl phenol, N,N,N',N'-tetraglycidyl-4,4'-methylene dianiline, N,N,N',N'-tetraglycidyl-2,2'-diethyl-4,4'-methylene dianiline, N,N,N',N'-tetraglycidyl-m-xylylene diamine, N,N-diglycidyl aniline, and N,N-diglycidyl-o-toluidine; and others such as resorcin diglycidyl ether, and triglycidyl isocyanurate. In particular, epoxy resins having 3 or more glycidyl groups in a molecule can form cured products having high glass transition temperatures and elastic modulus and accordingly serve suitably in the aviation and aerospace industries.

These epoxy resins may be used singly or in combination as appropriate. Combining an epoxy resin showing fluidity at an appropriate temperature with an epoxy resin showing no fluidity at an appropriate temperature is effective for fluidity control of the matrix resin during thermal curing of the resulting prepreg. For example, if the matrix resin is highly flowable before its gelation in the thermal curing step, disturbance in the orientation reinforcement fibers may take place, or the matrix resin may flow out of the system to alter the fiber mass content out of the predetermined range, possibly resulting in a fiber reinforced composite material with deteriorated physical properties. Combining a plurality of epoxy resins showing different viscoelastic behaviors at an appropriate temperature is effective for providing a prepreg having appropriate levels of tackiness and drape properties.

The epoxy resin composition according to the present invention may contain appropriately selected epoxy resin components other than component [A] such as monoepoxy resins containing an epoxy group in a molecule and alicyclic epoxy resins, unless they causes a significant reduction in the heat resistance or mechanical properties.

The curing agent of component [B] used for the present invention is a compound that has a heat generation starting temperature as measured by differential scanning calorimetry higher than that of component [C] and has active groups that can react with epoxy groups. Here, the heat generation starting temperature means the temperature at which the exothermic peak starts to rise (i.e., the point where heat generation of 0.2 W/g from the baseline occurs) in a heat generation curve that is obtained when an epoxy resin composition prepared by adding component [B] or component [C] to a bisphenol A type epoxy resin (jER (registered trademark) 825, manufactured by Mitsubishi Chemical Corporation) is analyzed by a differential scanning calorimeter (DSC Q2000, manufactured by TA Instrument) in a nitrogen atmosphere at a heating rate of 5° C./min. The epoxy resin composition used for determining the heat generation starting temperature is prepared in such a manner that the ratio of [the epoxy equivalent of the bisphenol A type epoxy resin/the mass of the bisphenol A type epoxy resin contained] to [the active hydrogen equivalent of component [B] or component [C]/the mass of component [B] or component [C] contained] is 1:1. It will be impossible to achieve a desired pot life in the prepreg production process if the heat generation starting temperature of component [B] is less than that of component [C].

Useful substances for use as the curing agent for component [B] include dicyandiamides, aromatic amine compounds, phenol novolac resins, cresol novolac resins, polyphenol compounds, imidazole derivatives, tetramethyl guanidines, thiourea-added amines, carboxylic acid hydrazides, carboxylic acid amide, and polymercaptans.

In particular, the use of an aromatic amine as the curing agent for component [B] makes it possible to produce a cured epoxy resin with high heat resistance. Such aromatic amine compounds include, for instance, 3,3'-diisopropyl-4,4'-diaminodiphenyl sulfone, 3,3'-di-t-butyl-4,4'-diaminodiphenyl sulfone, 3,3'-diethyl-5,5'-dimethyl-4,4'-diaminodiphenyl sulfone, 3,3'-diisopropyl-5,5'-dimethyl-4,4'-diaminodiphenyl sulfone, 3,3'-di-t-butyl-5,5'-dimethyl-4,4'-diaminodiphenyl sulfone, 3,3',5,5'-tetraethyl-4,4'-diaminodiphenyl sulfone, 3,3'-diisopropyl-5,5'-diethyl-4,4'-diaminodiphenyl sulfone, 3,3'-di-t-butyl-5,5'-diethyl-4,4'-diaminodiphenyl sulfone, 3,3',5,5'-tetraisopropyl-4,4'-diaminodiphenyl sulfone, 3,3'-di-t-butyl-5,5'-diisopropyl-4,4'-diaminodiphenyl sulfone, 3,3',5,5'-tetra-t-butyl-4,4'-diaminodiphenyl sulfone, 4,4'-diaminodiphenyl sulfone, and 3,3'-diaminodiphenyl sulfone.

To provide materials for spacecraft and aircraft, in particular, the use of 4,4'-diaminodiphenyl sulfone or 3,3'-diaminodiphenyl sulfone is preferred because the resulting cured products will have high heat resistance and elastic modulus while hardly suffering a decrease in linear expansion coefficient or a reduction in heat resistance due to water absorption. These aromatic amine compounds may be used singly or as a mixture of two or more thereof. When mixed with other components, they may be powder or liquid, or powdery and liquid aromatic amine compounds may be mixed together.

Component [C] according to the present invention is an aromatic amine compound as given by formula (a), and in formula (a), X represents one selected from the group consisting of C=O, S=O, and O=P—OH, and $R_1$ to $R_4$ each represent at least one selected from the group consisting of a hydrogen atom, an aliphatic hydrocarbon group containing 1 to 4 carbon atoms, an alicyclic hydrocarbon group containing 4 or less carbon atoms, and a halogen atom. Component [C] acts as an accelerator for the reaction between the epoxy resin of component [A] and the curing agent of component [B], and the reaction between the aromatic amine compound of component [C] and the epoxy resin of component [A] releases reaction heat to cause a local rise in temperature in the epoxy resin composition. This local rise in temperature works to accelerate the reaction between the curing agent of component [B] and the epoxy resin of component [A] to shorten the time period required for the completion of the curing reaction. Having an electron-withdrawing functional group, the aromatic amine compound of component [C] can serve for moderate control of the nucleophilicity of the amine to ensure a desired pot life at process temperatures commonly used for prepreg production. If an aromatic amine compound other than the compound of component [C] is used as a curing accelerator, the nucleophilicity of the amine is too high to achieve a desired pot life at process temperatures commonly used for prepreg production, although shortening of the curing time may be possible. Furthermore, a cured epoxy resin product with high heat resistance can be obtained because the aromatic amine compound of component [C] has a rigid chemical structure.

Examples of the compound of component [C] that contains C=O as X in formula (a) include 4,4'-diaminodiphenyl ketone, 4,4'-diamino-3,3',5,5'-tetraethyldiphenyl ketone, 4,4'-diamino-3,3',5,5'-tetrabromodiphenyl ketone, 3,4'-diaminodiphenyl ketone, 3,3'-diaminodiphenyl ketone, 4,4'-diamino-2,2'-dimethyldiphenyl ketone, 4,4'-diamino-2,3'-dimethyldiphenyl ketone, 4,4'-diamino-3,3'-dimethyldiphenyl ketone, 3,4'-diamino-5-methyldiphenyl ketone, 3,4'-diamino-2'-methyldiphenyl ketone, 3,4'-diamino-3'-methyldiphenyl ketone, 3,4'-diamino-5,2'-dimethyldiphenyl ketone, 3,4'-diamino-5,3'-dimethyldiphenyl ketone, 3,3'-diamino-5-methyldiphenyl ketone, and 3,3'-diamino-5,5'-dimethyldiphenyl ketone.

Examples of the compound of component [C] that contains S=O as X in formula (a) include 4,4'-diaminodiphenyl sulfoxide, 4,4'-diamino-3,3',5,5'-tetraethyldiphenyl sulfoxide, 4,4'-diamino-3,3',5,5'-tetrabromodiphenyl sulfoxide, 3,4'-diaminodiphenyl sulfoxide, 3,3'-diaminodiphenyl sulfoxide, 4,4'-diamino-2,2'-dimethyldiphenyl sulfoxide, 4,4'-diamino-2,3'-dimethyldiphenyl sulfoxide, 4,4'-diamino-3,3'-dimethyldiphenyl sulfoxide, 3,4'-diamino-5-methyldiphenyl sulfoxide, 3,4'-diamino-2'-methyldiphenyl sulfoxide, 3,4'-diamino-3'-methyldiphenyl sulfoxide, 3,4'-diamino-5,2'-dimethyldiphenyl sulfoxide, 3,4'-diamino-5,3'-dimethyldiphenyl sulfoxide, 3,3'-diamino-5-methyldiphenyl sulfoxide, and 3,3'-diamino-5,5'-dimethyldiphenyl sulfoxide.

Examples of the compound of component [C] that contains O=P—OH as X in formula (a) include 4,4'-diaminodiphenyl phosphinic acid, 4,4'-diamino-3,3',5,5'-tetraethyldiphenyl phosphinic acid, 4,4'-diamino-3,3',5,5'-tetrabromodiphenyl phosphinic acid, 3,4'-diaminodiphenyl phosphinic acid, 3,3'-diaminodiphenyl phosphinic acid, 4,4'-diamino-2,2'-dimethyldiphenyl phosphinic acid, 4,4'-diamino-2,3'-dimethyldiphenyl phosphinic acid, 4,4'-diamino-3,3'-dimethyldiphenyl phosphinic acid, 3,4'-diamino-5-methyldiphenyl phosphinic acid, 3,4'-diamino-2'-methyldiphenyl phosphinic acid, 3,4'-diamino-3'-methyldiphenyl phosphinic acid, 3,4'-diamino-5,2'-dimethyldiphenyl phosphinic acid, 3,4'-diamino-5,3'-dimethyldiphenyl phosphinic acid, 3,3'-diamino-5-methyldiphenyl phosphinic acid, and 3,3'-diamino-5,5'-dimethyldiphenyl phosphinic acid.

The epoxy resin composition according to the present invention meets both items (1) and (2) given below or both items (I) and (II) given below:

(1) (number of moles of active hydrogen atoms contained in component [B]+number of moles of active hydrogen atoms contained in component [C])/number of moles of epoxy groups in component [A]=0.5 to 1.5, (2) number of moles of component [C]/number of moles of component [B]=0.02 to 5.0;

(I) the content of component [C] is 1 to 25 parts by mass relative to 100 parts by mass of component [A], and (II) the content of component [C] is 1 to 55 parts by mass relative to 100 parts by mass of component [B].

A high fast-curability and heat resistance are realized if the requirement of 0.5 or more and 1.5 or less in item (1) is met. The curing reaction of the resin composition is accelerated if the requirement of 0.02 or more in item (2) is met, whereas shortening of the pot life can be prevented if the requirement of 5.0 or less is met. The curing reaction of the resin composition is accelerated if the content is 1 part by mass or more whereas shortening of the pot life can be prevented if it is 25 parts by mass or less, as specified in item (I). The reaction between the curing agent and the epoxy resin is accelerated and a high fast-curability and heat resistance are realized if the content is 1 to 55 parts by mass as specified in item (II).

Here, the number of moles of epoxy groups in component [A] is calculated as described below.

> Number of moles of epoxy groups in component [A]=number of parts by mass of component [A]/epoxy equivalent of component [A]

If component [A] contains two or more epoxy resin constituents, the sum of the number of moles of epoxy groups in each constituent is used, and for example, calculations are made as shown below in the case of two constituents.

> Number of moles of epoxy groups in component [A]=number of parts by mass of constituent 1 in component [A]/epoxy equivalent of constituent 1 in component [A]+number of parts by mass of constituent 2 in component [A]/epoxy equivalent of constituent 2 in component [A]

Furthermore, the number of moles of active hydrogen atoms in component [B] or [C] is calculated as described below.

> Number of moles of active hydrogen atoms in component [B]=number of parts by mass of component [B]/active hydrogen equivalent of component [B]

> Number of moles of active hydrogen atoms in component [C]=number of parts by mass of component [C]/active hydrogen equivalent of component [C]

In addition, the ratio of the number of moles of active hydrogen atoms contained in component [C] to the number of moles of epoxy groups in component [A] is preferably 0.05 to 0.9. The curing reaction of the resin composition is accelerated if the requirement of 0.05 or more is met, whereas shortening of the pot life can be prevented if the requirement of 0.9 or less is met.

Here, the number of moles of component [B] or [C] is calculated as described below.

> Number of moles of component [B]=number of parts by mass of component [B]/molecular weight of component [B]

> Number of moles of component [C]=number of parts by mass of component [C]/molecular weight of component [C]

In addition to component [C] according to the present invention, another curing accelerator may be used in combination unless it impairs the heat resistance or heat stability of the epoxy resin composition. Examples of such another curing accelerator include, for example, cationic polymerization initiators, tertiary amines, imidazole compounds, urea compounds, and hydrazide compounds.

It is preferable for the epoxy resin composition according to the present invention to further include a thermoplastic resin as component [D]. The addition of the thermoplastic resin of component [D] is intended to control the tackiness of the resulting prepreg, control the flowability of the matrix resin during the thermal curing of prepreg, and provide a tough fiber reinforced composite material without impairing the heat resistance or elastic modulus. The thermoplastic resin is preferably one having a polyaryl ether backbone, and good examples include polysulfone, polyphenyl sulfone, polyethersulfone, polyetherimide, polyphenylene ether, polyether ether ketone, and polyether ether sulfone. These thermoplastic resins having polyaryl ether backbones may be used singly or may be blended together appropriately. In particular, polyethersulfone and polyetherimide can be used suitably because they serve to produce a tough fiber reinforced composite material without impairing the heat resistance or mechanical properties.

Useful thermoplastic resins having polyaryl ether backbones have terminal functional groups such as primary amines, secondary amines, hydroxyl groups, carboxyl groups, thiol groups, anhydrides, and halogen groups (chlorine, bromine). Of these, halogen groups are preferred because they are low in reactivity with epoxy resins and accordingly serve to produce a prepreg with high storage stability, whereas functional groups other than the halogen groups are preferred because they are high in reactivity with epoxy resins and accordingly serve to produce a resin composition that realizes strong adhesion between epoxy resin and the thermoplastic resin.

The viscosity of the epoxy resin composition according to the present invention maintained at 80° C. for 2 hours is preferably 3.0 times or less, more preferably 2.0 times or less, and still more preferably 1.5 times or less, as large as the initial viscosity at 80° C. Here, to determine the rate of viscosity increase in the step of heating at 80° C. for 2 hours, the viscosity $\eta^*_1$ (initial viscosity at 80° C.) is measured after maintaining the specimen for 1 minute at 80° C. and the viscosity $\eta^*_{120}$ is measured after maintaining the specimen for 2 hours at 80° C., followed by calculating the ratio of $\eta^*_{120}/\eta^*_1$. The viscosity referred to herein is the complex viscosity $\eta^*$ that is determined by using a dynamic viscoelasticity measuring apparatus (ARES Rheometer, manufactured by TA Instruments) equipped with parallel plates with a diameter of 40 mm under the conditions of a frequency of 0.5 Hz and a gap of 1 mm.

The rate of viscosity increase during heating at 80° C. can serve as an indicator of the pot life of an epoxy resin composition in a resin composition kneading step and a prepreg production step. More specifically, a smaller rate of viscosity increase during heating at 80° C. means a more desirable pot life. If the rate of viscosity increase of an epoxy resin composition measured after maintaining it for 2 hours at 80° C. is 3.0 or less, it suggests that the resin composition is so high in heat stability that the performance of impregnation of reinforcement fiber with the resin does not decrease significantly during the prepreg production step, leading to moldings containing few voids.

When applied to structural members of aircraft, spacecraft, vehicles, etc., in particular, cured epoxy resin with high heat resistance is required. Heat resistance evaluation can be performed on the basis of glass transition temperatures determined from dynamic viscoelasticity measurements. It is preferable for the epoxy resin composition according to the present invention to have a glass transition temperature of 170° C. or more, more preferably 180° C. or more, and still more preferably 190° C. or more. Epoxy resin compositions with high glass transition temperatures are preferred because they can be applied to materials that require high heat resistance.

For the present invention, it may be desirable to add particles that contain a thermoplastic resin as primary component. The existence of thermoplastic resin particles serves to produce a fiber reinforced composite material having resin layers with improved toughness (hereinafter occasionally referred as interlaminar resin layers) between layers of reinforcement fibers in the fiber reinforced composite material, leading to an improved impact resistance.

Such thermoplastic resin particles may be of a thermoplastic resin that can be used as a component mixed in the epoxy resin composition, and in particular, polyamides are highly preferable. Among other polyamides, polyamide 12, polyamide 6, polyamide 11, polyamide 6/12 copolymers, and a polyamide partially modified with an epoxy compound into an IPN (interpenetrating polymer network) structure (semi-IPN polyamide) as described in Example 1 of Japanese Unexamined Patent Publication (Kokai) No. HEI 1-104624 can realize a particularly high-strength adhesion with epoxy resins. In regard to the shape of the thermoplastic resin particles, they may be spherical particles, non-spherical particles, or porous particles, of which spherical particles are preferable because they ensure high viscoelasticity by preventing deterioration in the flow characteristics of the resin and also ensure high impact resistance by eliminating potential starting points of stress concentrations. Useful commercial products of polyamide particles include SP-500, SP-10, TR-1, TR-2, 842P-48, and 842P-80 (all manufactured by Toray Industries, Inc.), and Orgasol (registered trademark) 1002D, 2001UD, 2001EXD, 2002D, 3202D, 3501D, and 3502D (all manufactured by Arkema K.K.). These polyamide particle materials may be used singly, or a plurality thereof may be used in combination.

The epoxy resin composition according to the present invention may contain a coupling agent, thermosetting resin particles, or inorganic fillers such as silica gel, carbon black, clay, carbon nanotube, graphene, carbon particles, and metal powder, unless they impair the advantageous effect of the invention.

To produce the prepreg according to the present invention, the epoxy resin composition described above was used as the matrix resin, and this resin composition was combined with reinforcement fibers to form a composite structure. Preferred reinforcement fibers include carbon fiber, graphite fiber, aramid fiber, and glass fiber, of which carbon fiber is particularly preferable.

Commercially available products of carbon fiber include Torayca (registered trademark) T800G-24K, Torayca (registered trademark) T800S-24K, Torayca (registered trademark) T700G-24K, Torayca (registered trademark) T300-3K, and Torayca (registered trademark) T700S-12K (all manufactured by Toray Industries, Inc.).

In regard to the form and way of alignment of carbon fibers, long fibers paralleled in one direction, woven fabrics, or others may be adopted appropriately, but if a carbon fiber reinforced composite material that is lightweight and relatively highly durable is to be obtained, it is preferable to use carbon fibers in the form of long fibers (fiber bundles) paralleled in one direction, woven fabric, or other continuous fibers.

A variety of generally known production methods are available for producing the prepreg according to the present invention: For instance, an appropriate prepreg can be produced by the wet method in which a matrix resin is dissolved in an organic solvent selected from the group of acetone, methyl ethyl ketone, methanol, etc., to reduce its viscosity and used to impregnate reinforcement fibers or by the hot melt method in which a matrix resin is heated to reduce its viscosity without using an organic solvent and used to impregnate reinforcement fibers.

With the wet method, reinforcement fibers may be immersed in a liquid containing a matrix resin and, after pulling it out, the organic solvent is evaporated in an apparatus such as oven to provide a prepreg.

The hot melt method can be carried out by a process in which a matrix resin, heated to decrease its viscosity, is used to directly impregnate reinforcement fibers or by a process in which a resin film-coated release paper sheet (hereinafter, occasionally referred to as resin film) composed of release paper or the like coated with a matrix resin is prepared first and the resin film-coated release paper sheet is attached to one or each surface of a reinforcement fiber sheet, followed by heating and pressurizing to allow the reinforcement fiber sheet to be impregnated with the a matrix resin.

For the production of the prepreg according to the present invention, the use of the hot melt method which can impregnate reinforcement fibers with a matrix resin without using an organic solvent is preferable because the resulting prepreg is substantially free of organic solvent residue.

The quantity of reinforcement fibers per unit area of the prepreg according to the present invention is preferably 30 to 2,000 g/m². If this quantity of reinforcement fibers is less than 30 g/m², a larger number of sheets have to be stacked to ensure a required thickness when molding fiber reinforced composite material, possibly leading to troublesome operations. If this quantity of reinforcement fibers is more than 2,000 g/m², on the other hand, the prepreg tends to have poor drape properties.

The fiber content by mass in the prepreg according to the present invention is preferably 30 to 90 mass %, more preferably 35 to 85 mass %, and still more preferably 40 to 80 mass %. If the fiber content by mass is less than 30 mass %, the quantity of resin is so large that the advantage of fiber reinforced composite materials in terms of high specific strength and specific modulus will be lost and an excessively large heat generation can occur during curing in the fiber reinforced composite material molding process. If the fiber content by mass is more than 90 mass %, the resin may fail to be impregnated properly, possibly resulting in a composite material containing many voids.

For example, the fiber reinforced composite material according to the present invention can be produced by stacking sheets of the aforementioned prepreg according to the invention into a required shape and subsequently pressed while heating to cure the resin. Here, the application of heat and pressure is carried out by using an appropriate method such as press molding, autoclave molding, bagging molding, wrapping tape molding, and internal pressure molding.

Fiber reinforced composite materials can be produced by a prepreg-free molding method in which reinforcement fibers are directly impregnated with the epoxy resin composition according to the present invention, followed by heating for curing, and examples of such methods include hand lay-up molding, filament winding, pultrusion, resin injection molding, and resin transfer molding.

EXAMPLES

The invention is described in more detail below with reference to Examples. However, the scope of the present invention is not limited to such examples. Hereinafter, the term "parts" used to refer to the proportion of a component material means "parts by mass" unless otherwise stated. Determination of various characteristics was performed in an environment with a temperature of 23° C. and relative humidity of 50% unless otherwise specified.

Material Used in Examples and Comparative Examples (1) Component [A]: epoxy resin
bisphenol A type epoxy resin (jER (registered trademark) 825, manufactured by Mitsubishi Chemical Corporation) epoxy equivalent 175 (g/eq.)
bisphenol F type epoxy resin (EPICLON (registered trademark) 830, manufactured by DIC Corporation) epoxy equivalent 172 (g/eq.)
tetraglycidyl diaminodiphenyl methane (Araldite (registered trademark) MY721, manufactured by Huntsman Advanced Materials Gmbh) epoxy equivalent 113 (g/eq.)
triglycidyl-m-aminophenol (Araldite (registered trademark) MY0600, manufactured by Huntsman Advanced Materials Gmbh) epoxy equivalent 106 (g/eq.)
triglycidyl-p-aminophenol (Araldite (registered trademark) MY0500, manufactured by Huntsman Advanced Materials Gmbh) epoxy equivalent 106 (g/eq.)
triphenylol methane triglycidyl ether (TACTIX742, manufactured by Huntsman Advanced Materials Gmbh) epoxy equivalent 160 (g/eq.)

(2) Component [B]: a curing agent having a heat generation starting temperature as measured by differential scanning calorimetry higher than the heat generation starting temperature of component [C]
4,4'-diaminodiphenyl sulfone (Seikacure S, manufactured by Wakayama Seika Kogyo Co., Ltd.) heat generation starting temperature determined by differential scanning calorimetry 175° C., active hydrogen equivalent 62 (g/eq.)
3,3'-diaminodiphenyl sulfone (3,3'-DAS, manufactured by Mitsui Fine Chemical, Inc.) heat generation starting temperature determined by differential scanning calorimetry 166° C., active hydrogen equivalent 62 (g/eq.)

(3) Component [C]: compound represented by formula (a).
4,4'-diaminodiphenyl ketone, heat generation starting temperature determined by differential scanning calorimetry 151° C., active hydrogen equivalent 53 (g/eq.)
4,4'-diaminodiphenyl sulfoxide, heat generation starting temperature determined by differential scanning calorimetry 152° C., active hydrogen equivalent 58 (g/eq.)
4,4'-diaminodiphenyl phosphinic acid, heat generation starting temperature determined by differential scanning calorimetry 155° C., active hydrogen equivalent 62 (g/eq.)
3,3'-diaminodiphenyl ketone, heat generation starting temperature determined by differential scanning calorimetry 143° C., active hydrogen equivalent 53 (g/eq.)
3,3'-diaminodiphenyl sulfoxide, heat generation starting temperature determined by differential scanning calorimetry 143° C., active hydrogen equivalent 58 (g/eq.)
3,3'-diaminodiphenyl phosphinic acid, heat generation starting temperature determined by differential scanning calorimetry 146° C., active hydrogen equivalent 62 (g/eq.)

(4) Compound X: compounds not contained in component [B] or component [C]
4,4'-diaminodiphenyl ether, heat generation starting temperature determined by differential scanning calorimetry 121° C., active hydrogen equivalent 50 (g/eq.)
4,4'-diaminodiphenyl methane, heat generation starting temperature determined by differential scanning calorimetry 118° C., active hydrogen equivalent 50 (g/eq.)
4,4'-diaminobenzanilide, heat generation starting temperature determined by differential scanning calorimetry 129° C., active hydrogen equivalent 57 (g/eq.)

(5) Component [D]: thermoplastic resin
polyethersulfone (Sumikaexcel (registered trademark) PES5003P, manufactured by Sumitomo Chemical Co., Ltd.)
<Methods for Preparation and Evaluation of Epoxy Resin Composition>
The epoxy resin composition samples prepared in Examples and Comparative examples were examined by the methods described below.

(1) Preparation of Epoxy Resin Composition
An epoxy resin adopted as component [A] as specified in Tables 1 to 5 and the compound of component [D] were fed in a kneading apparatus and heat-kneaded to dissolve the compound of component [D]. Then, the temperature was lowered to 100° C. or less while continuing the kneading and component [B] and component [C] as specified in Tables 1 to 5 were added (component [B] or component [C] is not added or compound X is added instead of component [C] in some Comparative examples), followed by stirring to provide an epoxy resin composition.

(2) Method for Measurement of Viscosity of Epoxy Resin Composition after Maintaining it for 1 Minute at 80° C. and its Viscosity after Maintaining it for 2 Hours at 80° C.

The viscosity of the epoxy resin composition was measured by using a dynamic viscoelasticity measuring machine (ARES Rheometer, manufactured by TA Instruments) equipped with flat parallel plates with a diameter of 40 mm installed on the upper and lower measuring jigs. The epoxy resin composition was set between the upper and lower measuring jigs separated with a jig distance of 1 mm, and measurements were made in the twisting mode (measuring frequency 0.5 Hz). The viscosity $\eta^*_1$ was measured after maintaining the specimen for 1 minute at 80° C. and the viscosity $\eta^*_{120}$ was measured after maintaining it for 2 hours at 80° C., followed by calculating the rate of viscosity increase (pot life) as $\eta^*_{120}/\eta^*_1$. In Tables 1 to 5, results of pot life rating are represented by A, B, C, and D when the rate of viscosity increase was 1.5 or less, more than 1.5 and 2.0 or less, more than 2.0 and 3.0 or less, and more than 3.0, respectively.

(3) Method for Measurement of Glass Transition Temperature of Cured Epoxy Resin Product An epoxy resin composition was first injected in a mold, heated up in a hot air drier from 30° C. at a rate of 1.5° C./min, heat-cured at 180° C. for 2 hours, and cooled to 30° C. at a rate of 2.5° C./min to prepare a cured resin plate with a thickness of 2 mm. A test piece with a width of 12.7 mm and a length of 55 mm was cut out of the cured resin plate and its glass transition temperature was determined by the DMA technique according to SACMA SRM18R-94. The temperature at the intersection point between the tangent to the storage modulus G' curve in the glassy state and the tangent thereto in the transitional state was adopted as the glass transition temperature. Here, measurements were taken under the conditions of a heating rate of 5° C./min and a frequency of 1 Hz. Regarding the heat resistance evaluation, A, B, C, and D in Tables 1 to 5 represent a glass transition temperature of 190° C. or more, 180° C. or more and less than 190° C., 170° C. or more and less than 180° C., and less than 170° C., respectively.

(4) Method for Measurement of Gel Time of Epoxy Resin Composition

Using a curelastometer, the curing reactivity of an epoxy resin composition was determined from the changes in rotation torque with time. Here, Rubber Process Analyzer RPA2000 (manufactured by Alpha Technologies) was used to heat up the test piece from 40° C. to 180° C. at a rate of 1.7° C./min and heated at 180° C. for 2 hours. The time period from the start of heating at 40° C. until the torque exceeded 1 dNm was adopted as the gel time. Regarding the fast curability evaluation, A, B, C, and D in Tables 1 to 5 represent a gel time of 80 minutes or less, more than 80 minutes and 90 minutes or less, more than 90 minutes and 95 minutes or less, and more than 95 minutes, respectively.

Examples 1 to 6 and Comparative Example 1

Results obtained when the various curing accelerators listed in Table 1 were used as component [C] showed that a large shortening of the gel time, which indicates a high fast-curability, was realized without a significant change in the rate of viscosity increase, as compared with Comparative example 1 (not containing component [C]) described in Table 4. The glass transition temperature did not show a significant decrease in Examples 1 to 6 as compared with Comparative example 1, and a high value of 190° C. or more was realized.

Examples 7 to 15 and Comparative Examples 2 to 10

As seen from Tables 1, 2, and 4, results obtained in Example 7 to 15, where different epoxy resins were used, show that the existence of 4,4'-diaminodiphenyl ketone served to realize a large shortening of the gel time without a significant change in the rate of viscosity increase, as compared with Comparative examples 2 to 10 (not containing component [C]). In Examples 7 to 11, an increase in the content of tetraglycidyl diaminodiphenyl methane, which is an epoxy resin having three or more glycidyl groups in a molecule, serves to realize the preferred tendency of improvement in the glass transition temperature without an adverse influence on the fast curability or pot life.

Examples 16 and 17 and Comparative Examples 11 and 12

As seen from Tables 2 and 5, Examples 16 and 17 used curing agents that are different from those used in Examples 1 and 11 and Comparative examples 1 and 6, which lead to shortening of the gel time without impairing the pot life or heat resistance as compared with Comparative examples 11 and 12 (not containing component [C]). As compared with Examples 1 and 11, a different curing agent was used in Examples 16 and 17 and gave practically satisfactory results although showing a small decrease in the pot life and heat resistance.

Examples 18 to 32

As seen from Tables 2 and 3, the content of component [C] was varied in Examples 18 to 21 and Examples 27 to 32 and results proved practically satisfactory characteristics, although showing that an increase in content tends to lead to a higher rate of viscosity increase as well as a shorter gel time.

Examples 33 and 34

As seen from Table 3, results of tests with varied contents of a curing agent show that the gel time tends to shorten with an increase in the content.

Comparative Examples 13 to 15

As seen from Table 5, when a compound X, which is not included in component [C], was used as curing accelerator, the rate of viscosity increase was high and preferred characteristics were not obtained.

Comparative Examples 16 to 18

As seen from Comparative example 16 in Table 5, component [C] accounted for less than 1 part by mass relative to 100 parts by mass of component [A], leading to undesired results including insufficient shortening of the gel time. As seen from Comparative examples 17 and 18, component [C] accounted for more than 25 parts by mass relative to 100 parts by mass of component [A], leading to undesired characteristics including a significant rise in the rate of viscosity increase and a significant decrease in the glass transition temperature.

Comparative Examples 19 to 21

As seen from Comparative example 19 in Table 5, when the quotient of (the number of moles of active hydrogen atoms contained in component [B]+the number of moles of active hydrogen atoms contained in component [C]) divided by the number of moles of epoxy groups in component [A] was less than 0.5, the heat resistance was low and the gel time was not shortened sufficiently, showing poor results. As seen from Comparative example 20, furthermore, when the quotient of (the number of moles of active hydrogen atoms contained in component [B]+the number of moles of active hydrogen atoms contained in component [C]) divided by the number of moles of epoxy groups in component [A] was more than 1.5, there were a significant rise in the rate of viscosity increase and a significant decrease in the glass transition temperature, showing poor characteristics. As seen from Table 6, the rate of viscosity increase was large and the characteristics were poor in Comparative example 21 where the content of component [C] was large.

Comparative Examples 22 to 24

As seen from Table 6, evaluations of an epoxy resin composition consisting only of components [A], [C], and [D] gave poor results including a high rate of viscosity increase.

Comparative Examples 25 to 27

As seen from Table 6, when a compound X, which is not included in component [B], was used as curing agent, the rate of viscosity increase was high, indicating poor results.

TABLE 1

| Epoxy resin composition | | Example 1 | Example 2 | Example 3 | Example 4 | Example 5 |
|---|---|---|---|---|---|---|
| Component [A] epoxy resin | | | | | | |
| | bisphenol A type epoxy (jER ®825) | 40 | 40 | 40 | 40 | 40 |
| | bisphenol F type epoxy (EPICLON ®830) | | | | | |
| | tetraglycidyl diaminodiphenyl methane (Araldite ®MY721) | 60 | 60 | 60 | 60 | 60 |
| | triglycidyl-m-aminophenol (Araldite ®MY0600) | | | | | |
| | triglycidyl-p-aminophenol (Araldite ®MY0500) | | | | | |
| | triphenylol methane triglycidyl ether (TACTIX742) | | | | | |
| Component [B] curing agent | | | | | | |
| | 4,4'-diaminodiphenyl sulfone (Seikacure S) | 47 | 47 | 47 | 47 | 47 |
| | 3,3'-diaminodiphenyl sulfone (3,3'-DAS) | | | | | |
| Component [C] compound of formula (a) | | | | | | |
| | 4,4'-diaminodiphenyl ketone | 5 | | | | |
| | 4,4'-diaminodiphenyl sulfoxide | | 5 | | | |
| | 4,4'-diaminodiphenyl phosphinic acid | | | 5 | | |
| | 3,3'-diaminodiphenyl ketone | | | | 5 | |
| | 3,3'-diaminodiphenyl sulfoxide | | | | | 5 |
| | 3,3'-diaminodiphenyl phosphinic acid | | | | | |
| Component [D] thermoplastic resin | | | | | | |
| | polyethersulfone (Sumikaexcel ®PES5003P) | 10 | 10 | 10 | 10 | 10 |
| (Number of moles of active hydrogen atoms contained in component [B] + number of moles of active hydrogen atoms contained in component [C])/number of moles of epoxy groups in component [A] | | 1.12 | 1.11 | 1.10 | 1.12 | 1.11 |
| Number of moles of component [C]/number of moles of component [B] | | 0.12 | 0.11 | 0.11 | 0.12 | 0.11 |
| Number of moles of active hydrogen atoms contained in component [C]/number of moles of epoxy groups in component [A] | | 0.12 | 0.11 | 0.11 | 0.12 | 0.11 |
| Content of component [C] (parts by mass) relative to 100 parts by mass of component [B] | | 11 | 11 | 11 | 11 | 11 |
| Characteristics of resin composition | rate of viscosity increase (—) | 1.3 | 1.3 | 1.2 | 1.5 | 1.5 |
| | pot life | A | A | A | A | A |
| | gel time (min) | 79 | 80 | 84 | 76 | 77 |
| | fast curability | A | A | B | A | A |
| Characteristics of cured resin | glass transition temperature (° C.) | 203 | 199 | 205 | 201 | 197 |
| | heat resistance | A | A | A | A | A |

| Epoxy resin composition | | Example 6 | Example 7 | Example 8 | Example 9 | Example 10 |
|---|---|---|---|---|---|---|
| Component [A] epoxy resin | | | | | | |
| | bisphenol A type epoxy (jER ®825) | 40 | 100 | 80 | 60 | 20 |
| | bisphenol F type epoxy (EPICLON ®830) | | | | | |
| | tetraglycidyl diaminodiphenyl methane (Araldite ®MY721) | 60 | | 20 | 40 | 80 |
| | triglycidyl-m-aminophenol (Araldite ®MY0600) | | | | | |
| | triglycidyl-p-aminophenol (Araldite ®MY0500) | | | | | |
| | triphenylol methane triglycidyl ether (TACTIX742) | | | | | |

TABLE 1-continued

|  |  |  |  |  |  |  |
|---|---|---|---|---|---|---|
| Component [B] curing agent | | | | | | |
| | 4,4'-diaminodiphenyl sulfone (Seikacure S) | 47 | 35 | 39 | 43 | 51 |
| | 3,3'-diaminodiphenyl sulfone (3,3'-DAS) | | | | | |
| Component [C] compound of formula (a) | | | | | | |
| | 4,4'-diaminodiphenyl ketone | | 5 | 5 | 5 | 5 |
| | 4,4'-diaminodiphenyl sulfoxide | | | | | |
| | 4,4'-diaminodiphenyl phosphinic acid | | | | | |
| | 3,3'-diaminodiphenyl ketone | | | | | |
| | 3,3'-diaminodiphenyl sulfoxide | | | | | |
| | 3,3'-diaminodiphenyl phosphinic acid | 5 | | | | |
| Component [D] thermoplastic resin | | | | | | |
| | polyethersulfone (Sumikaexcel ®PES5003P) | 10 | 10 | 10 | 10 | 10 |
| (Number of moles of active hydrogen atoms contained in component [B] + number of moles of active hydrogen atoms contained in component [C])/number of moles of epoxy groups in component [A] | | 1.10 | 1.15 | 1.14 | 1.13 | 1.12 |
| Number of moles of component [C]/number of moles of component [B] | | 0.11 | 0.17 | 0.15 | 0.14 | 0.11 |
| Number of moles of active hydrogen atoms contained in component [C]/number of moles of epoxy groups in component [A] | | 0.11 | 0.17 | 0.15 | 0.14 | 0.11 |
| Content of component [C] (parts by mass) relative to 100 parts by mass of component [B] | | 11 | 14 | 13 | 12 | 10 |
| Characteristics of resin composition | rate of viscosity increase (—) | 1.4 | 1.4 | 1.4 | 1.3 | 1.1 |
| | pot life | A | A | A | A | A |
| | gel time (min) | 80 | 72 | 75 | 78 | 84 |
| | fast curability | A | A | A | A | B |
| Characteristics of cured resin | glass transition temperature (° C.) | 203 | 180 | 188 | 195 | 214 |
| | heat resistance | A | B | B | A | A |

TABLE 2

| Epoxy resin composition | | Example 11 | Example 12 | Example 13 | Example 14 | Example 15 |
|---|---|---|---|---|---|---|
| Component [A] epoxy resin | | | | | | |
| | bisphenol A type epoxy (jER ®825) | | 40 | 40 | | |
| | bisphenol F type epoxy (EPICLON ®830) | | | | | 40 |
| | tetraglycidyl diaminodiphenyl methane (Araldite ®MY721) | 100 | | | 60 | 60 |
| | triglycidyl-m-aminophenol (Araldite ®MY0600) | | 60 | | | |
| | triglycidyl-p-aminophenol (Araldite ®MY0500) | | | 60 | | |
| | triphenylol methane triglycidyl ether (TACTIX742) | | | | 40 | |
| Component [B] curing agent | | | | | | |
| | 4,4'-diaminodiphenyl sulfone (Seikacure S) | 55 | 49 | 49 | 48 | 47 |
| | 3,3'-diaminodiphenyl sulfone (3,3'-DAS) | | | | | |
| Component [C] compound of formula (a) | | | | | | |
| | 4,4'-diaminodiphenyl ketone | 5 | 5 | 5 | 5 | 5 |
| | 4,4'-diaminodiphenyl sulfoxide | | | | | |
| | 4,4'-diaminodiphenyl phosphinic acid | | | | | |
| Component [D] thermoplastic resin | | | | | | |
| | polyethersulfone (Sumikaexcel ®PES5003P) | 10 | 10 | 10 | 10 | 10 |
| (Number of moles of active hydrogen atoms contained in component [B] + number of moles of active hydrogen atoms contained in component [C])/number of moles of epoxy groups in component [A] | | 1.11 | 1.11 | 1.11 | 1.11 | 1.12 |
| Number of moles of component [C]/number of moles of component [B] | | 0.11 | 0.12 | 0.12 | 0.12 | 0.12 |
| Number of moles of active hydrogen atoms contained in component [C]/number of moles of epoxy groups in component [A] | | 0.11 | 0.12 | 0.12 | 0.12 | 0.12 |
| Content of component [C] (parts by mass) relative to 100 parts by mass of component [B] | | 9 | 10 | 10 | 10 | 11 |
| Characteristics of resin composition | rate of viscosity increase (—) | 1.1 | 1.4 | 1.4 | 1.3 | 1.3 |
| | pot life | A | A | A | A | A |
| | gel time (min) | 88 | 76 | 78 | 79 | 79 |
| | fast curability | B | A | A | A | A |
| Characteristics of cured resin | glass transition temperature (° C.) | 228 | 193 | 198 | 227 | 192 |
| | heat resistance | A | A | A | A | A |

TABLE 2-continued

| Epoxy resin composition | | Example 16 | Example 17 | Example 18 | Example 19 | Example 20 |
|---|---|---|---|---|---|---|
| | Component [A] epoxy resin | | | | | |
| | bisphenol A type epoxy (jER ®825) | 40 | | 40 | 40 | 40 |
| | bisphenol F type epoxy (EPICLON ®830) | | | | | |
| | tetraglycidyl diaminodiphenyl methane (Araldite ®MY721) | 60 | 100 | 60 | 60 | 60 |
| | triglycidyl-m-aminophenol (Araldite ®MY0600) | | | | | |
| | triglycidyl-p-aminophenol (Araldite ®MY0500) | | | | | |
| | triphenylol methane triglycidyl ether (TACTIX742) | | | | | |
| | Component [B] curing agent | | | | | |
| | 4,4'-diaminodiphenyl sulfone (Seikacure S) | | | 47 | 47 | 47 |
| | 3,3'-diaminodiphenyl sulfone (3,3'-DAS) | 47 | 55 | | | |
| | Component [C] compound of formula (a) | | | | | |
| | 4,4'-diaminodiphenyl ketone | 5 | 5 | 1 | 3 | 10 |
| | 4,4'-diaminodiphenyl sulfoxide | | | | | |
| | 4,4'-diaminodiphenyl phosphinic acid | | | | | |
| | Component [D] thermoplastic resin | | | | | |
| | polyethersulfone (Sumikaexcel ®PES5003P) | 10 | 10 | 10 | 10 | 10 |
| (Number of moles of active hydrogen atoms contained in component [B] + number of moles of active hydrogen atoms contained in component [C])/number of moles of epoxy groups in component [A] | | 1.12 | 1.11 | 1.02 | 1.07 | 1.25 |
| Number of moles of component [C]/number of moles of component [B] | | 0.12 | 0.11 | 0.02 | 0.07 | 0.25 |
| Number of moles of active hydrogen atoms contained in component [C]/ number of moles of epoxy groups in component [A] | | 0.12 | 0.11 | 0.02 | 0.07 | 0.25 |
| Content of component [C] (parts by mass) relative to 100 parts by mass of component [B] | | 11 | 9 | 2 | 6 | 21 |
| Characteristics of resin composition | rate of viscosity increase (—) | 1.5 | 1.3 | 1.2 | 1.3 | 1.7 |
| | pot life | A | A | A | A | B |
| | gel time (min) | 73 | 82 | 93 | 85 | 76 |
| | fast curability | A | B | C | B | A |
| Characteristics of cured resin | glass transition temperature (° C.) | 193 | 220 | 201 | 202 | 190 |
| | heat resistance | A | A | A | A | A |

TABLE 3

| Epoxy resin composition | | Example 21 | Example 22 | Example 23 | Example 24 | Example 25 | Example 26 | Example 27 |
|---|---|---|---|---|---|---|---|---|
| | component [A] epoxy resin | | | | | | | |
| | bisphenol A type epoxy (jER ®825) | 40 | 40 | 40 | 40 | 40 | 40 | 40 |
| | bisphenol F type epoxy (EPICLON ®830) | | | | | | | |
| | tetraglycidyl diaminodiphenyl methane (Araldite ®MY721) | 60 | 60 | 60 | 60 | 60 | 60 | 60 |
| | triglycidyl-m-aminophenol (Araldite ®MY0600) | | | | | | | |
| | triglycidyl-p-aminophenol (Araldite ®MY0500) | | | | | | | |
| | triphenylol methane triglycidyl ether (TACTIX742) | | | | | | | |
| | component [B] curing agent | | | | | | | |
| | 4,4'-diaminodiphenyl sulfone (Seikacure S) | 47 | 20 | 20 | 20 | 20 | 10 | 47 |
| | 3,3'-diaminodiphenyl sulfone (3,3'-DAS) | | | | | | | |
| | component [C] compound of formula (a) | | | | | | | |
| | 4,4'-diaminodiphenyl ketone | 20 | 5 | 10 | 25 | 32 | 32 | |
| | 4,4'-diaminodiphenyl sulfoxide | | | | | | | 1 |
| | 4,4'-diaminodiphenyl phosphinic acid | | | | | | | |
| | component [D] thermoplastic resin | | | | | | | |
| | polyethersulfone (Sumikaexcel ®PES5003P) | 10 | 10 | 10 | 10 | 10 | 10 | 10 |
| (Number of moles of active hydrogen atoms contained in component [B] + number of moles of active hydrogen atoms contained in component [C])/number of moles of epoxy groups in component [A] | | 1.49 | 0.55 | 0.67 | 1.05 | 1.22 | 1.01 | 1.02 |
| Number of moles of component [C]/number of moles of component [B] | | 0.50 | 0.29 | 0.58 | 1.46 | 1.87 | 3.74 | 0.02 |
| Number of moles of active hydrogen atoms contained in component [C]/number of moles of epoxy groups in component [A] | | 0.50 | 0.12 | 0.25 | 0.62 | 0.79 | 0.79 | 0.02 |

TABLE 3-continued

|  |  |  |  |  |  |  |  |
|---|---|---|---|---|---|---|---|
| Content of component [C] (parts by mass) relative to 100 parts by mass of component [B] | 43 | 25 | 50 | 125 | 160 | 320 | 2 |
| Characteristics of resin composition — rate of viscosity increase (—) | 2.2 | 1.1 | 1.5 | 2.0 | 2.3 | 2.0 | 1.2 |
| pot life | C | A | A | B | C | B | A |
| gel time (min) | 63 | 85 | 80 | 68 | 64 | 66 | 93 |
| fast curability | A | B | A | A | A | A | C |
| Characteristics of cured resin — glass transition temperature (° C.) | 181 | 173 | 181 | 205 | 201 | 207 | 201 |
| heat resistance | B | C | B | A | A | A | A |

| Epoxy resin composition | Example 28 | Example 29 | Example 30 | Example 31 | Example 32 | Example 33 | Example 34 |
|---|---|---|---|---|---|---|---|
| component [A] epoxy resin | | | | | | | |
| bisphenol A type epoxy (jER ®825) | 40 | 40 | 40 | 40 | 40 | 40 | 40 |
| bisphenol F type epoxy (EPICLON ®830) | | | | | | | |
| tetraglycidyl diaminodiphenyl methane (Araldite ®MY721) | 60 | 60 | 60 | 60 | 60 | 60 | 60 |
| triglycidyl-m-aminophenol (Araldite ®MY0600) | | | | | | | |
| triglycidyl-p-aminophenol (Araldite ®MY0500) | | | | | | | |
| triphenylol methane triglycidyl ether (TACTIX742) | | | | | | | |
| component [B] curing agent | | | | | | | |
| 4,4'-diaminodiphenyl sulfone (Seikacure S) | 47 | 47 | 47 | 47 | 47 | 33 | 57 |
| 3,3'-diaminodiphenyl sulfone (3,3'-DAS) | | | | | | | |
| component [C] compound of formula (a) | | | | | | | |
| 4,4'-diaminodiphenyl ketone | | | | | | 5 | 5 |
| 4,4'-diaminodiphenyl sulfoxide | 3 | 10 | | | | | |
| 4,4'-diaminodiphenyl phosphinic acid | | | 1 | 3 | 10 | | |
| component [D] thermoplastic resin | | | | | | | |
| polyethersulfone (Sumikaexcel ®PES5003P) | 10 | 10 | 10 | 10 | 10 | 10 | 10 |
| (number of moles of active hydrogen atoms contained in component [B] + number of moles of active hydrogen atoms contained in component [C])/number of moles of epoxy groups in Component [A] | 1.07 | 1.23 | 1.02 | 1.07 | 1.25 | 0.82 | 1.33 |
| number of moles of component [C]/number of moles of component [B] | 0.07 | 0.23 | 0.02 | 0.06 | 0.21 | 0.18 | 0.10 |
| Number of moles of active hydrogen atoms contained in component [C]/number of moles of epoxy groups in component [A] | 0.07 | 0.23 | 0.02 | 0.06 | 0.21 | 0.12 | 0.12 |
| Content of component [C] (parts by mass) relative to 100 parts by mass of component [B] | 6 | 21 | 2 | 6 | 21 | 15 | 9 |
| Characteristics of resin composition — rate of viscosity increase (—) | 1.3 | 1.7 | 1.1 | 1.1 | 1.5 | 1.1 | 1.5 |
| pot life | A | B | A | A | A | A | A |
| gel time (min) | 87 | 77 | 94 | 89 | 81 | 89 | 77 |
| fast curability | B | A | C | B | B | B | A |
| Characteristics of cured resin — glass transition temperature (° C.) | 200 | 186 | 201 | 204 | 195 | 182 | 193 |
| heat resistance | A | B | A | A | A | B | A |

TABLE 4

| Epoxy resin composition | Comparative example 1 | Comparative example 2 | Comparative example 3 | Comparative example 4 | Comparative example 5 |
|---|---|---|---|---|---|
| Component [A] epoxy resin | | | | | |
| bisphenol A type epoxy (jER ®825) | 40 | 100 | 80 | 60 | 20 |
| bisphenol F type epoxy (EPICLON ®830) | | | | | |
| tetraglycidyl diaminodiphenyl methane (Araldite ®MY721) | 60 | | 20 | 40 | 80 |
| triglycidyl-m-aminophenol (Araldite ®MY0600) | | | | | |
| triglycidyl-p-aminophenol (Araldite ®MY0500) | | | | | |
| triphenylol methane triglycidyl ether (TACTIX742) | | | | | |

TABLE 4-continued

| Epoxy resin composition | | | | | | |
|---|---|---|---|---|---|---|
| Component [B] curing agent | | | | | | |
| | 4,4'-diaminodiphenyl sulfone (Seikacure S) | 47 | 35 | 39 | 43 | 51 |
| | 3,3'-diaminodiphenyl sulfone (3,3'-DAS) | | | | | |
| Component [D] thermoplastic resin | | | | | | |
| | polyethersulfone (Sumikaexcel ®PES5003P) | 10 | 10 | 10 | 10 | 10 |
| (Number of moles of active hydrogen atoms contained in component [B] + number of moles of active hydrogen atoms contained in component [C])/number of moles of epoxy groups in component [A] | | 1.00 | 0.99 | 0.99 | 1.00 | 1.00 |
| Number of moles of component [C]/number of moles of component [B] | | 0 | 0 | 0 | 0 | 0 |
| Number of moles of active hydrogen atoms contained in component [C]/number of moles of epoxy groups in component [A] | | 0 | 0 | 0 | 0 | 0 |
| Content of component [C] (parts by mass) relative to 100 parts by mass of component [B] | | 0 | 0 | 0 | 0 | 0 |
| Characteristics of resin composition | rate of viscosity increase (—) | 1.2 | 1.4 | 1.4 | 1.3 | 1.1 |
| | pot life | A | A | A | A | A |
| | gel time (min) | 105 | 98 | 100 | 103 | 109 |
| | fast curability | D | D | D | D | D |
| Characteristics of cured resin | glass transition temperature (° C.) | 201 | 178 | 188 | 193 | 210 |
| | heat resistance | A | C | B | A | A |

| Epoxy resin composition | | Comparative example 6 | Comparative example 7 | Comparative example 8 | Comparative example 9 | Comparative example 10 |
|---|---|---|---|---|---|---|
| Component [A] epoxy resin | | | | | | |
| | bisphenol A type epoxy (jER ®825) | | 40 | 40 | | |
| | bisphenol F type epoxy (EPICLON ®830) | | | | | 40 |
| | tetraglycidyl diaminodiphenyl methane (Araldite ®MY721) | 100 | | | 60 | 60 |
| | triglycidyl-m-aminophenol (Araldite ®MY0600) | | 60 | | | |
| | triglycidyl-p-aminophenol (Araldite ®MY0500) | | | 60 | | |
| | triphenylol methane triglycidyl ether (TACTIX742) | | | | 40 | |
| Component [B] curing agent | | | | | | |
| | 4,4'-diaminodiphenyl sulfone (Seikacure S) | 55 | 49 | 49 | 48 | 47 |
| | 3,3'-diaminodiphenyl sulfone (3,3'-DAS) | | | | | |
| Component [D] thermoplastic resin | | | | | | |
| | polyethersulfone (Sumikaexcel ®PES5003P) | 10 | 10 | 10 | 10 | 10 |
| (Number of moles of active hydrogen atoms contained in component [B] + number of moles of active hydrogen atoms contained in component [C])/number of moles of epoxy groups in component [A] | | 1.00 | 0.99 | 0.99 | 0.99 | 0.99 |
| Number of moles of component [C]/number of moles of component [B] | | 0 | 0 | 0 | 0 | 0 |
| Number of moles of active hydrogen atoms contained in component [C]/number of moles of epoxy groups in component [A] | | 0 | 0 | 0 | 0 | 0 |
| Content of component [C] (parts by mass) relative to 100 parts by mass of component [B] | | 0 | 0 | 0 | 0 | 0 |
| Characteristics of resin composition | rate of viscosity increase (—) | 1.1 | 1.4 | 1.4 | 1.3 | 1.3 |
| | pot life | A | A | A | A | A |
| | gel time (min) | 113 | 100 | 102 | 104 | 104 |
| | fast curability | D | D | D | D | D |
| Characteristics of cured resin | glass transition temperature (° C.) | 222 | 191 | 195 | 225 | 190 |
| | heat resistance | A | A | A | A | A |

TABLE 5

| Epoxy resin composition | | Comparative example 11 | Comparative example 12 | Comparative example 13 | Comparative example 14 | Comparative example 15 |
|---|---|---|---|---|---|---|
| Component [A] epoxy resin | | | | | | |
| | bisphenol A type epoxy (jER ®825) | 40 | | 40 | 40 | 40 |
| | bisphenol F type epoxy (EPICLON ®830) | | | | | |
| | tetraglycidyl diaminodiphenyl methane (Araldite ®MY721) | 60 | 100 | 60 | 60 | 60 |
| | triglycidyl-m-aminophenol (Araldite ®MY0600) | | | | | |
| | triglycidyl-p-aminophenol (Araldite ®MY0500) | | | | | |
| | triphenylol methane triglycidyl ether (TACTIX742) | | | | | |
| Component [B] curing agent | | | | | | |
| | 4,4'-diaminodiphenyl sulfone (Seikacure S) | | | 47 | 47 | 47 |
| | 3,3'-diaminodiphenyl sulfone (3,3'-DAS) | 47 | 55 | | | |
| component [C] compound of formula (a) | | | | | | |
| | 4,4'-diaminodiphenyl ketone | | | | | |
| | 4,4'-diaminodiphenyl sulfoxide | | | | | |
| | 4,4'-diaminodiphenyl phosphinic acid | | | | | |
| | Compound X | | | | | |
| compound not included in component [B] or component [C] | | | | | | |
| | 4,4'-diaminodiphenyl ether | | | 5 | | |
| | 4,4'-diaminodiphenyl methane | | | | 5 | |
| | 4,4'-diaminobenzanilide | | | | | 5 |
| Component [D] thermoplastic resin | | | | | | |
| | polyethersulfone (Sumikaexcel ®PES5003P) | 10 | 10 | 10 | 10 | 10 |
| (Number of moles of active hydrogen atoms contained in component [B] + number of moles of active hydrogen atoms contained in component [C])/number of moles of epoxy groups in component [A] | | 1.00 | 1.00 | 1.00 | 1.00 | 1.00 |
| Number of moles of component [C]/number of moles of component [B] | | 0 | 0 | 0 | 0 | 0 |
| Number of moles of active hydrogen atoms contained in component [C]/number of moles of epoxy groups in component [A] | | 0 | 0 | 0 | 0 | 0 |
| Content of component [C] (parts by mass) relative to 100 parts by mass of component [B] | | 0 | 0 | 0 | 0 | 0 |
| Characteristics of resin composition | rate of viscosity increase (—) | 1.5 | 1.4 | 4.5 | 4.7 | 3.5 |
| | pot life | A | A | D | D | D |
| | gel time (min) | 100 | 108 | 76 | 74 | 78 |
| | fast curability | D | D | A | A | A |
| Characteristics of cured resin | glass transition temperature (° C.) | 192 | 216 | 191 | 189 | 201 |
| | heat resistance | A | A | A | B | A |

| Epoxy resin composition | | Comparative example 16 | Comparative example 17 | Comparative example 18 | Comparative example 19 | Comparative example 20 |
|---|---|---|---|---|---|---|
| Component [A] epoxy resin | | | | | | |
| | bisphenol A type epoxy (jER ®825) | 40 | 40 | 40 | 40 | 40 |
| | bisphenol F type epoxy (EPICLON ®830) | | | | | |
| | tetraglycidyl diaminodiphenyl methane (Araldite ®MY721) | 60 | 60 | 60 | 60 | 60 |
| | triglycidyl-m-aminophenol (Araldite ®MY0600) | | | | | |
| | triglycidyl-p-aminophenol (Araldite ®MY0500) | | | | | |
| | triphenylol methane triglycidyl ether (TACTIX742) | | | | | |
| Component [B] curing agent | | | | | | |
| | 4,4'-diaminodiphenyl sulfone (Seikacure S) | 47 | 47 | 47 | 15 | 71 |
| | 3,3'-diaminodiphenyl sulfone (3,3'-DAS) | | | | | |
| component [C] compound of formula (a) | | | | | | |
| | 4,4'-diaminodiphenyl ketone | 0.5 | 25 | 30 | 5 | 5 |
| | 4,4'-diaminodiphenyl sulfoxide | | | | | |
| | 4,4'-diaminodiphenyl phosphinic acid | | | | | |
| | Compound X | | | | | |
| compound not included in component [B] or component [C] | | | | | | |
| | 4,4'-diaminodiphenyl ether | | | | | |
| | 4,4'-diaminodiphenyl methane | | | | | |
| | 4,4'-diaminobenzanilide | | | | | |
| Component [D] thermoplastic resin | | | | | | |
| | polyethersulfone (Sumikaexcel ®PES5003P) | 10 | 10 | 10 | 10 | 10 |

TABLE 5-continued

| | | | | | | |
|---|---|---|---|---|---|---|
| (Number of moles of active hydrogen atoms contained in component [B] + number of moles of active hydrogen atoms contained in component [C])/number of moles of epoxy groups in component [A] | | 1.01 | 1.62 | 1.74 | 0.44 | 1.63 |
| Number of moles of component [C]/number of moles of component [B] | | 0.012 | 0.62 | 0.75 | 0.39 | 0.08 |
| Number of moles of active hydrogen atoms contained in component [C]/number of moles of epoxy groups in component [A] | | 0.01 | 0.62 | 0.75 | 0.12 | 0.12 |
| Content of component [C] (parts by mass) relative to 100 parts by mass of component [B] | | 1 | 53 | 64 | 33 | 7 |
| Characteristics of resin composition | rate of viscosity increase (—) | 1.2 | 2.5 | 3.2 | 1.1 | 2.1 |
| | pot life | A | C | D | A | C |
| | gel time (min) | 98 | 72 | 70 | 91 | 73 |
| | fast curability | D | A | A | C | A |
| Characteristics of cured resin | glass transition temperature (° C.) | 201 | 175 | 165 | 165 | 170 |
| | heat resistance | A | C | D | P | C |

TABLE 6

| Epoxy resin composition | | Comparative example 21 | Comparative example 22 | Comparative example 23 | Comparative example 24 |
|---|---|---|---|---|---|
| component [A] epoxy resin | | | | | |
| | bisphenol A type epoxy (jER ®825) | 40 | 40 | 40 | 40 |
| | bisphenol F type epoxy (EPICLON ®830) | | | | |
| | tetraglycidyl diaminodiphenyl methane (Araldite ®MY721) | 60 | 60 | 60 | 60 |
| | triglycidyl-m-aminophenol (Araldite ®MY0600) | | | | |
| | triglycidyl-p-aminophenol (Araldite ®MY0500) | | | | |
| | triphenylol methane triglycidyl ether (TACTIX742) | | | | |
| component [B] curing agent | | | | | |
| | 4,4'-diaminodiphenyl sulfone (Seikacure S) | 10 | | | |
| | 3,3'-diaminodiphenyl sulfone (3,3'-DAS) | | | | |
| component [C] compound of formula (a) | | | | | |
| | 4,4'-diaminodiphenyl ketone | 50 | 40 | | |
| | 4,4'-diaminodiphenyl sulfoxide | | | 44 | |
| | 4,4'-diaminodiphenyl phosphinic acid | | | | 47 |
| | Compound X | | | | |
| compound not included in component [B] or component [C] | | | | | |
| | 4,4'-diaminodiphenyl ether | | | | |
| | 4,4'-diaminodiphenyl methane | | | | |
| | 4,4'-diaminobenzanilide | | | | |
| component [D] thermoplastic resin | | | | | |
| | polyethersulfone (Sumikaexcel ®PES5003P) | 10 | 10 | 10 | 10 |
| (Number of moles of active hydrogen atoms contained in component [B] + number of moles of active hydrogen atoms contained in component [C])/ number of moles of epoxy groups in component [A] | | 1.45 | 0.99 | 1.00 | 1.00 |
| Number of moles of component [C]/number of moles of component [B] | | 5.85 | — | — | — |
| number of moles of active hydrogen atoms contained in component [C]/ number of moles of epoxy groups in component [A] | | 1.24 | 0.99 | 1.00 | 1.00 |
| Content of component [C] (parts by mass) relative to 100 parts by mass of component [B] | | 500 | — | — | — |
| Characteristics of resin composition | rate of viscosity increase (—) | 3.8 | 3.5 | 3.6 | 3.1 |
| | pot life | D | D | D | D |
| | gel time (min) | 58 | 69 | 70 | 76 |
| | fast curability | A | A | A | A |
| Characteristics of cured resin | glass transition temperature (° C.) | 182 | 210 | 197 | 215 |
| | heat resistance | B | A | A | A |

| Epoxy resin composition | | Comparative example 25 | Comparative example 26 | Comparative example 27 |
|---|---|---|---|---|
| component [A] epoxy resin | | | | |
| | bisphenol A type epoxy (jER ®825) | 40 | 40 | 40 |
| | bisphenol F type epoxy (EPICLON ®830) | | | |
| | tetraglycidyl diaminodiphenyl methane (Araldite ®MY721) | 60 | 60 | 60 |
| | triglycidyl-m-aminophenol (Araldite ®MY0600) | | | |
| | triglycidyl-p-aminophenol (Araldite ®MY0500) | | | |
| | triphenylol methane triglycidyl ether (TACTIX742) | | | |

TABLE 6-continued

| | | | | |
|---|---|---|---|---|
| component [B] curing agent | | | | |
| | 4,4'-diaminodiphenyl sulfone (Seikacure S) | | | |
| | 3,3'-diaminodiphenyl sulfone (3,3'-DAS) | | | |
| component [C] compound of formula (a) | | | | |
| | 4,4'-diaminodiphenyl ketone | 5 | 5 | 5 |
| | 4,4'-diaminodiphenyl sulfoxide | | | |
| | 4,4'-diaminodiphenyl phosphinic acid | | | |
| | Compound X | | | |
| compound not included in component [B] or component [C] | | | | |
| | 4,4'-diaminodiphenyl ether | 33 | | |
| | 4,4'-diaminodiphenyl methane | | 33 | |
| | 4,4'-diaminobenzanilide | | | 38 |
| component [D] thermoplastic resin | | | | |
| | polyethersulfone (Sumikaexcel ®PES5003P) | 10 | 10 | 10 |
| (Number of moles of active hydrogen atoms contained in component [B] + number of moles of active hydrogen atoms contained in component [C])/number of moles of epoxy groups in component [A] | | 0.12 | 0.12 | 0.12 |
| Number of moles of component [C]/number of moles of component [B] | | — | — | — |
| number of moles of active hydrogen atoms contained in component [C]/number of moles of epoxy groups in component [A] | | 0.12 | 0.12 | 0.12 |
| Content of component [C] (parts by mass) relative to 100 parts by mass of component [B] | | — | — | — |
| Characteristics of resin composition | rate of viscosity increase (—) | 5.5 | 5.8 | 4.5 |
| | pot life | D | D | D |
| | gel time (min) | 72 | 70 | 73 |
| | fast curability | A | A | A |
| Characteristics of cured resin | glass transition temperature (° C.) | 185 | 182 | 205 |
| | heat resistance | B | B | A |

The invention claimed is:

1. An epoxy resin composition comprising at least the components [A] to [C] given below, the content of each component meeting equations (1) and (2):
   [A] an epoxy resin,
   [B] a curing agent having a heat generation starting temperature as measured by differential scanning calorimetry higher than the heat generation starting temperature of component [C], and
   [C] a compound as represented by formula (a),

[Chemical formula 1]

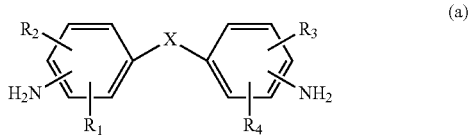

(a)

wherein in formula (a), X represents O=P—OH, and $R_1$ to $R_4$ each represent at least one selected from the group consisting of a hydrogen atom, an aliphatic hydrocarbon group containing 1 to 4 carbon atoms, an alicyclic hydrocarbon group containing 4 or less carbon atoms, and a halogen atom;
   (1) 0.5≤(number of moles of active hydrogen atoms contained in component [B]+number of moles of active hydrogen atoms contained in component [C])/number of moles of epoxy groups in component [A]≤1.5, and
   (2) 0.02≤number of moles of component [C]/number of moles of component [B]≤5.0.

2. An epoxy resin composition as set forth in claim 1, wherein the blending proportion between component [A] and component [C] meets the relation given below:
   (3) 0.05≤number of moles of active hydrogen atoms contained in component [C]/number of moles of epoxy groups in component [A]≤0.9.

3. An epoxy resin composition as set forth in claim 1, wherein component [A] includes an epoxy resin having three or more glycidyl groups in a molecule.

4. An epoxy resin composition as set forth in claim 3, wherein a glycidyl amine type epoxy resin having three or more glycidyl groups in a molecule accounts for 40 to 100 parts by mass relative to 100 parts by mass of component [A].

5. An epoxy resin composition as set forth in claim 1, wherein component [B] is an aromatic amine compound.

6. An epoxy resin composition as set forth in claim 1 further comprising a component [D] as described below:
   [D] thermoplastic resin.

7. An epoxy resin composition as set forth in claim 1 that, when cured at 180° C. for 2 hours, forms a cured material having a glass transition temperature of 170° C. or more as determined by dynamic viscoelasticity measurement.

8. An epoxy resin composition as set forth in claim 1, wherein the viscosity thereof measured after retention at 80° C. for 2 hours is 3.0 times or less as large as the initial viscosity at 80° C.

9. A prepreg comprising reinforcement fibers impregnated with an epoxy resin composition as set forth in claim 1.

10. A fiber reinforced composite material obtainable by curing a prepreg as set forth in claim 9.

11. A fiber reinforced composite material comprising a cured resin obtainable by curing an epoxy resin composition as set forth in claim 1 and reinforcement fibers.

12. An epoxy resin composition comprising at least the components [A] to [C] given below, the content of component [C] being 1 to 25 parts by mass relative to 100 Orts by mass of component [A], and the content of component [C] being 1 to 55 parts by mass relative to 100 parts by mass of component [B]:
   [A] an epoxy resin,
   [B] a curing agent having a heat generation starting temperature as measured by differential scanning calorimetry higher than the heat generation starting temperature of component [C], and

[C] a compound as represented by formula (a),

[Chemical formula 2]

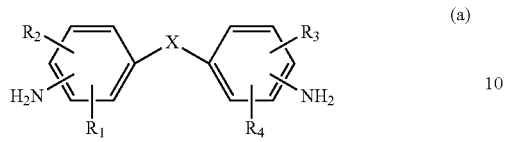

(a)

wherein in formula (a), X represents O=P—OH, and $R_1$ to $R_4$ each represent at least one selected from the group consisting of a hydrogen atom, an aliphatic hydrocarbon group containing 1 to 4 carbon atoms, an alicyclic hydrocarbon group containing 4 or less carbon atoms, and a halogen atom.

* * * * *